Aug. 16, 1949.　　　　　A. C. STOVER　　　　　2,479,427
FOUR-WHEEL STEERING MECHANISM FOR VEHICLES
Filed April 1, 1946　　　　　　　　　　　　　2 Sheets-Sheet 1
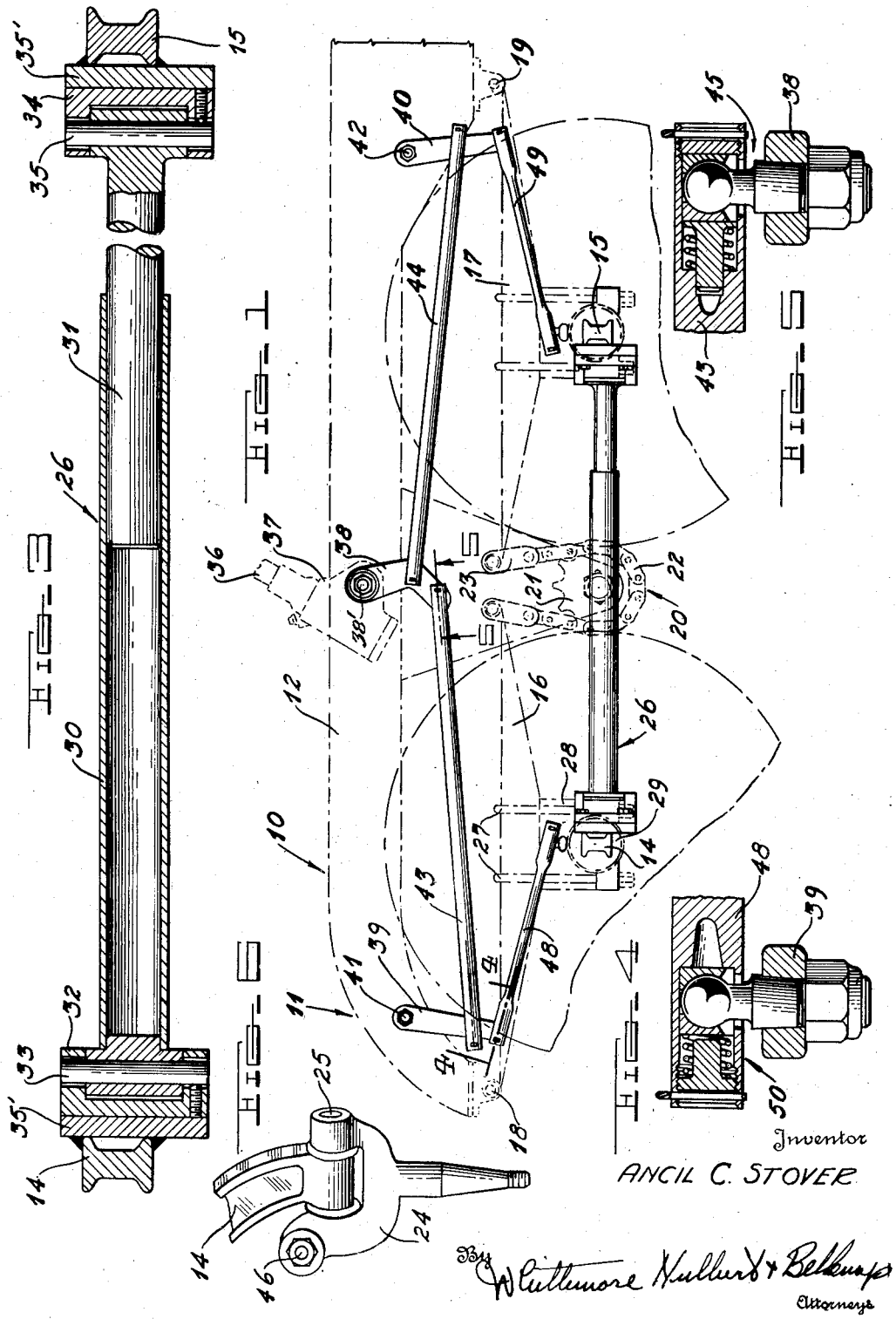
Inventor
ANCIL C. STOVER

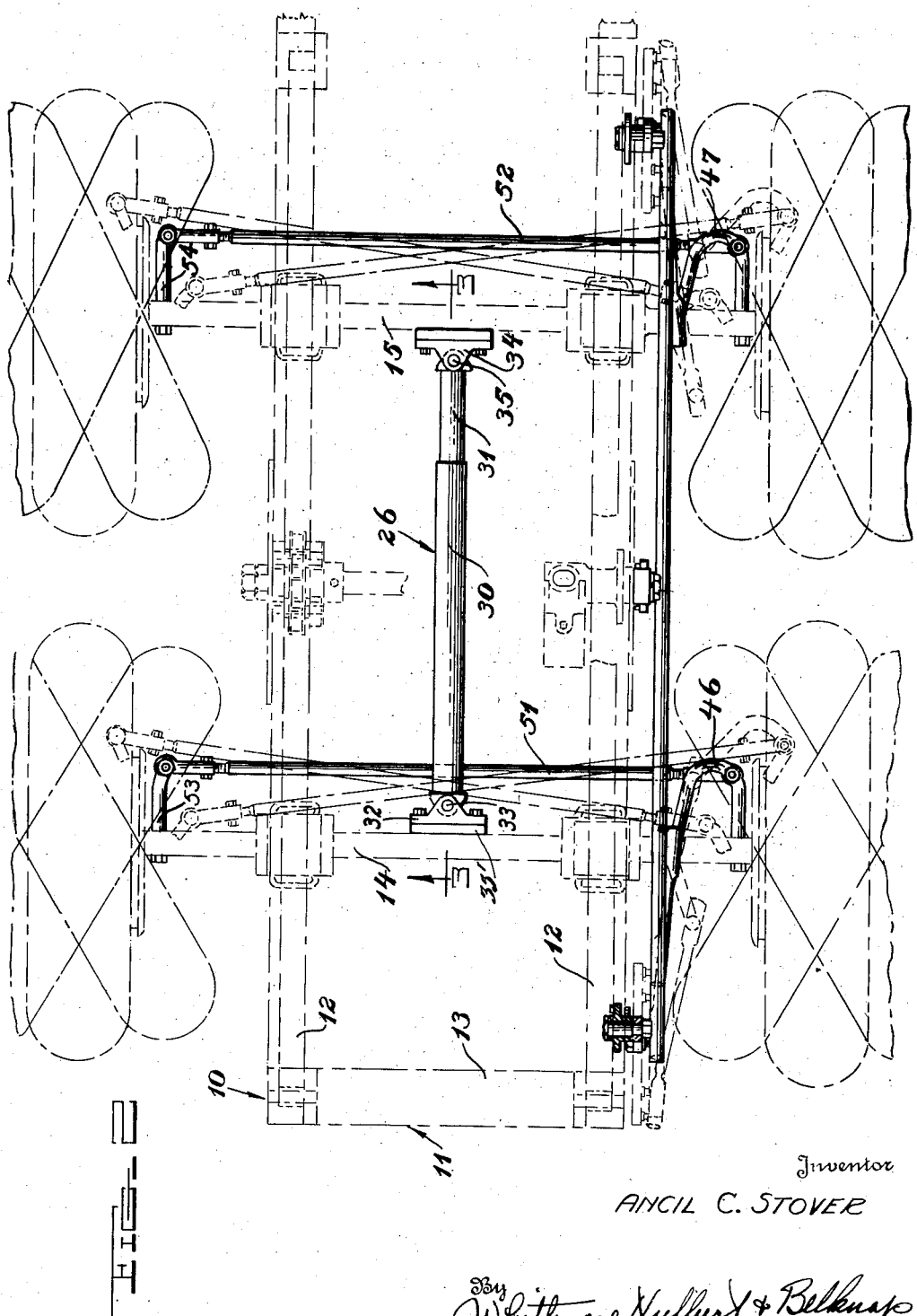

Patented Aug. 16, 1949

2,479,427

UNITED STATES PATENT OFFICE 2,479,427

FOUR-WHEEL STEERING MECHANISM FOR VEHICLES

Ancil C. Stover, Van Wert, Ohio, assignor to The Eisenhauer Manufacturing Company, Van Wert, Ohio, a copartnership Application April 1, 1946, Serial No. 658,824

10 Claims. (Cl. 280—91)

1

This invention relates generally to motor vehicles and refers more particularly to improvements in the front end constructions of motor vehicles.

In certain types of heavy duty vehicles such, for example, as trucks and tractors, it is advantageous to divide the load at the front end between two tandem axle assemblies including ground engaging wheels. It has long been recognized that such an arrangement would reduce the unit load on the road surface and greatly improve handling of heavy duty vehicles, but the problems of providing satisfactory steering mechanism for the tandem wheels prevented manufacturers from taking advantage of these features.

It is an object of this invention to provide commercially practical steering mechanism composed of a relatively few simple parts capable of being readily assembled in operative relation to tandemly arranged wheels to simultaneously steer both sets of wheels from a common control.

Another object of this invention is to greatly improve the stability of the front end assembly and prevent wandering of the steering wheels, by providing a construction which assures maintaining a predetermined caster angle or steering knuckle-pivot rake regardless of load variations or torque reactions resulting from brake application.

Still another feature of this invention is to provide steering mechanism for tandem wheels embodying a geometrical arrangement which enables obtaining a relatively wide steering radius without appreciable scuffing of the tires on the road surface.

The foregoing as well as other objects will be made more apparent as this description proceeds, especially when considered in connection with the accompanying drawings, wherein:

Figure 1 is a fragmentary side elevational view of the front end portion of a vehicle;

Figure 2 is a plan view of the construction shown in Figure 1;

Figure 3 is a sectional view taken substantially on the line 3—3 of Figure 2;

Figure 4 is a sectional view taken on the line 4—4 of Figure 1;

Figure 5 is a sectional view taken on the line 5—5 of Figure 1; and

Figure 6 is a fragmentary perspective view of one of the steering knuckles.

Referring now more in detail to the drawings, it will be noted that the reference character 10 indicates generally the front end portion of a

2 vehicle having a frame 11 comprising side sills 12 secured in lateral spaced relationship by means of cross members 13. The frame 11 is supported on a set of front axles 14 and 15 extending transversely of the side sills 12 beneath the latter and spaced from each other longitudinally of the frame.

The front axle 14 of the set is connected to the frame by a pair of semi-elliptical leaf springs 16 and the rear axle 15 is similarly connected to the frame by a pair of semi-elliptical leaf springs 17. The pairs of springs 16 and 17 are respectively secured intermediate their ends to the front and rear axles 14 and 15 in a manner to be more fully hereinafter described. The front ends of the springs 16 are pivoted to the corresponding ends of the frame 11 by means of pins 18, and the rear ends of the springs are respectively pivoted to the side sills 12 by means of pins 19. The adjacent ends of the springs at opposite sides of the frame are respectively connected together by load equalizing mechanism indicated generally by the reference character 20. This mechanism comprises a pair of sprockets 21 and a pair of chains 22. The intermediate portions of the chains respectively mesh with the sprockets 21 and the extremities of the chains are equipped with links 23. The links 23 of the chain at one side of the frame are respectively pivotally secured to the adjacent ends of the springs 16 and 17 at the same side of the frame, while the links of the chain at the opposite side of the frame are respectively pivotally connected to the adjacent ends of the other set of springs. Thus, the loads applied to the front end portion of the vehicle are more or less equally distributed between the front and rear axle assemblies 14 and 15.

A ground engaging wheel is supported at each axle end, and a steering knuckle 24 of the type shown in Figure 6 of the drawings is provided for this purpose. In accordance with conventional practice, the steering knuckles are respectively pivotally connected to the axle ends by a king pin 25, having its axis inclined with respect to the vertical to provide the desired caster angle or steering knuckle-pivot rake. The importance of maintaining the king pins at the proper caster angle is well known in this art, and provision is made herein for accomplishing this result regardless of load variations or torque reactions caused by brake application. In general, the caster angle is maintained by rotatably supporting the suspension springs on the axles, and by connecting the axles with a torque arm 26. In detail, the central portion of each suspension spring is clamped by U-bolts 27 to a bearing block, and the latter is, in turn, journalled on a cylindrical portion 29 formed on the axle. The bearing block 28 is, of course, formed of two sections for the purpose of assembly, and these sections are held together by the U-bolts 27.

The torque arm 26 comprises a tube 30 and a rod 31, which telescopically engages the tube. The front end of the tube and the rear end of the rod 31 are formed with vertical bores and are respectively secured to yokes 32 and 34 by vertical pins 33 and 35 extending through the bores. Sufficient clearance is provided between the pins and bores in the yokes to prevent binding of the parts during spring deflection. The yokes 32 and 34 are respectively secured to the front and rear axles by plates 35' and suitable shims (not shown) may be inserted between the plates and yokes to vary the caster angle as required. It follows from the foregoing that both axles are held against rocking movement and that the caster angles of the king pins on the respective axles are maintained notwithstanding stresses resulting from variations in load, spring deflection or torque reaction caused by brake application.

In the present instance, the ground engaging wheels connected to the front axle and the ground engaging wheels connected to the rear axle may be turned simultaneously in the same direction by manipulating a common steering control 36. The control 36 forms a part of a conventional type of steering gearing mechanism comprising a housing 37 for the gearing (not shown) and a steering arm 38 connected to the gearing by a shaft 38'. For the purpose of illustration, it will be assumed that the steering gear mechanism is supported on the left hand side of the vehicle frame between the front and rear axles. The swinging or lower end of the steering arm 38 is respectively connected to a pair of arms 39 and 40. The arm 39 is pivotally supported on the frame 11 in advance of the front axle 14 by a pin 41, and the arm 40 is pivotally connected to the frame at the rear of the axle 15 by a pin 42. The axes of the pins 41 and 42 extend parallel to the axis of swinging movement of the steering arm and are spaced equal distances from the latter axis. It will also be observed from Figure 1 of the drawings that the distance between the axis of the pin 41 and the axis of the front axle 14 is approximately the same as the distance between the axis of the pin 42 and the axis of the rear axle 15. The arm 38 is connected to the swinging end portions of the arms 39 and 40 by a pair of links 43 and 44 respectively. The link 43 is pivotally connected to the steering arm 38 by the adjustable coupling 45 shown in Figure 5 of the drawings, and the adjacent end of the link 44 is pivotally connected to the steering arm 38 by a similar coupling. In actual practice, the same coupling arrangement may be employed to respectively pivotally connect the outer ends of the links to the arms 39 and 40.

The steering knuckles 24 for the ground engaging wheels at the left hand side of the frame are respectively connected to the swinging ends of the arms 39 and 40. Upon reference to Figure 2 of the drawings, it will be noted that substantially U-shaped brackets 46 and 47 have the outer leg portions respectively connected to the left-hand steering knuckles 24. The inner leg portions of the brackets 46 and 47 are, in turn, respectively connected to the swinging ends of the arms 39 and 40 by drag-links 48 and 49. The drag-links are respectively pivotally connected to both the arms and brackets by couplings 50 of the type shown in Figure 4 of the drawings.

The axis of drag link 48 is aligned with the center line of the fixed hanger 18 to approximate all conditions, and the axis of the drag link 49 is similarly aligned with fixed hanger 19. Thus, an approximate common center is secured for the arc which either axle describes when moved vertically, together with its accompanying drag link. As a result of this arrangement, vertical deflection of either axle in relation to the main frame cannot impart steering motion, thus promoting stability.

It follows from the foregoing that rocking movement of the steering arm 38 by the steering gear mechanism 37 imparts turning moment to the left hand front and rear ground engaging wheels. This turning moment is transferred to the right hand wheels by connecting rods 51 and 52. One end of the rod 51 is suitably pivotally connected to the bracket 46, and the other end of the rod is pivotally connected to a bar 53 which, in turn, is secured to the steering knuckle 24 associated with the front right hand wheel. One end of the rod 52 is pivotally connected to the bracket 47 and the opposite end is pivotally connected to a bar 54 which is secured to the steering knuckle 24 for the right hand rear wheel. In practice, it may be preferred to turn the front ground engaging wheels throughout a greater angle or radius than the rear ground engaging wheels in order to reduce scuffing of the tires on the road surface. The geometry of the steering linkage shown in the drawings is predetermined to afford the above result. In detail, it will be noted that this is accomplished through the greater turning moment of the front idler arm 39 as compared with the turning moment of the rear idler arm 40, resulting from the differential in spacing of the coupling 45 of the link 43 from the center line of steering gear sector shaft as compared with the spacing of the coupling 45 of the link 44 from the center line of the steering gear sector shaft. This differential is modified by the spacings of the couplings 50 of the links 43 and 44 on idler arms 39 and 40.

What I claim as my invention is:

1. A front end construction for vehicles comprising a frame, a pair of axles extending transversely of the frame in tandem relationship and having steering knuckles at opposite ends thereof, a ground engaging wheel journalled on each knuckle, a pair of arms respectively pivotally supported on the frame at one side of the latter beyond the axles outwardly thereof and having their axes of pivotal movement spaced substantially equal distances from the axes of the respective axles, drag links respectively connecting the arms to the knuckles on the same side of the frame as the arms, steering mechanism including an arm supported at said one side of the frame intermediate the pair of arms for rocking movement, links respectively connecting the steering arm to said pair of arms, and means connecting the knuckles at opposite ends of each axle.

2. A front end construction for vehicles comprising a frame, a pair of axles extending transversely of the frame in tandem relationship and having steering knuckles at opposite ends thereof, a ground engaging wheel journalled in each knuckle, a pair of arms respectively pivotally supported on the frame at one side of the latter beyond the axles outwardly thereof and having their axes of pivotal movement spaced substantially equal distances from the axes of the respective axles for rocking movement, drag links respectively connecting the arms to the knuckles on the same side of the frame as the arms, steering mechanism including an arm supported at said one side of the frame intermediate the pair of arms for rocking movement, means connecting the steering knuckles at opposite ends of the axles, and means connecting the steering arm to said pair of arms and responsive to rocking movement of the steering arm to turn the wheels associated with the front wheel throughout a greater radius than the wheels on the rear axle.

3. A front end construction for vehicles comprising a frame, a pair of axles extending transversely of the frame in tandem relationship and having steering knuckles at opposite ends thereof, a ground engaging wheel journalled on each knuckle, means respectively connecting the knuckles at opposite ends of the axles together, an arm journalled on one side of the frame in advance of the front axle and connected to the knuckle at the adjacent end of the front axle, a second arm journalled on the said one side of the frame in rear of the rear axle and connected to the knuckle at the adjacent end of said rear axle, steering mechanism including an arm journalled on the same side of the frame as the arms aforesaid and having it axis spaced equal distances from the axes of the first and second arms, and means connecting the steering arm to the first and second arms.

4. A front end construction for vehicles comprising a frame, a pair of axles extending transversely of the frame in tandem relationship and having steering knuckles at opposite ends thereof, a ground engaging wheel journalled on each knuckle, means respectively connecting the steering knuckles at opposite ends of the axles, an arm pivoted at one side of the frame in advance of the front axle and connected to the steering knuckle at the adjacent end of the front axle, a second arm pivoted at the said one side of the frame in rear of the rear axle and having its axis of pivotal movement spaced from the axis of the rear axle a distance substantially equal to the space between the axis of pivotal movement of the first named arm and the axis of the front axle, means connecting the swinging end of the second arm to the steering knuckle at the adjacent end of the rear axle, steering mechanism including an arm journalled at the same side of the frame as said arms and having its axis of swinging movement spaced equal distances from the axes of pivotal movement of said arms, and means connecting the steering arm to the first and second arms.

5. A front end construction for vehicles comprising a frame, a pair of axles extending transversely of the frame in tandem relationship and having steering knuckles at opposite ends thereof, a ground engaging wheel journalled on each knuckle, means respectively connecting the knuckles at opposite ends of the axles together, an arm journalled on one side of the frame in advance of the front axle and connected to the knuckle at the adjacent end of the front axle, a second arm journalled on the said one side of the frame in rear of the rear axle and connected to the knuckle at the adjacent end of said rear axle, steering mechanism including an arm journalled on the same side of the frame as the arms aforesaid and having its axis spaced equal distances from the axes of the first and second arms, and a pair of links of substantially equal length having their inner ends respectively pivotally connected to the steering arm and having their outer ends respectively connected to the first and second arms.

6. A front end construction for vehicles comprising a frame, a pair of axles extending transversely of the frame in tandem relationship and having steering knuckles at opposite ends thereof, a ground engaging wheel journalled on each knuckle, means respectively connecting the steering knuckles at opposite ends of the axles, an arm pivoted at one side of the frame in advance of the front axle and connected to the steering knuckle at the adjacent end of the front axle, a second arm pivoted at the said one side of the frame in rear of the rear axle and having its axis of pivotal movement spaced from the axis of the rear axle a distance substantially equal to the space between the axis of pivotal movement of the first named arm and the axis of the front axle, means connecting the swinging end of the second arm to the steering knuckle at the adjacent end of the rear axle, steering mechanism including an arm journalled at the same side of the frame as said arms and having its axis of swinging movement spaced equal distances from the axes of pivotal movement of said arms, and a pair of links of substantially equal length having their inner ends respectively connected to the steering arm at different distances from the axis of swinging movement of said arm and having their outer ends respectively pivotally connected to the first and second arms.

7. A front end construction for vehicles comprising a frame, a pair of axles extending transversely of the frame in tandem relationship and having steering knuckles at opposite ends thereof, a ground engaging wheel journalled on each knuckle, pairs of suspension springs respectively supported intermediate the ends thereof on the axles and having the outer ends respectively pivoted to the frame, a pair of arms respectively pivotally supported at one side of the frame between the axles and outer ends of the springs, drag links respectively connecting the swinging ends of the arms to the knuckles at the same side of the frame as the arms and having their axes respectively lying in planes including the axes of the pivotal connections between the outer ends of the springs and frame, and steering mechanism operatively connected to both of said arms.

8. A front end construction for vehicles comprising a frame, a pair of axles extending transversely of the frame in tandem relationship and having steering knuckles at opposite ends thereof, a ground engaging wheel journalled on each knuckle, pairs of suspension springs respectively supported intermediate the ends thereof on the axles and having the outer ends respectively pivoted to the frame, an arm journalled on one side of the frame in advance of the front axle, a second arm pivoted on the said one side of the frame in rear of the rear axle and having its axis of swinging movement spaced from the rear axle a distance substantially equal to the distance between the axis of swinging movement of the first arm and the front axle, drag links respectively connecting the arms to the knuckles at the same side of the frame as the arms and having their axes respectively lying in planes including the pivotal connections between the outer ends of the springs and frame, and steering mechanism supported on the frame and operatively connected to said arms.

9. A front end construction for vehicles comprising a frame, a pair of axles extending transversely of the frame in tandem relationship and having steering knuckles at opposite ends thereof, a ground engaging wheel journalled on each knuckle, pairs of suspension springs respectively supported intermediate the ends thereof on the axles and having the outer ends respectively pivoted to the frame, an arm journalled on one side of the frame in advance of the front axle, a second arm pivoted at the said side of the frame in rear of the rear axle, drag links respectively connecting the swinging ends of the arms to the steering knuckles at the same side of the frame as the arms and having their respective axes lying in planes including the pivotal connections between the outer ends of the springs and frame, steering mechanism including an arm pivoted on the same side of the frame as the arms and having its axis spaced equal distances from the axes of said arms, and means connecting the steering arm to the first and second arms.

10. A front end construction for vehicles comprising a frame, a pair of axles extending transversely of the frame in tandem relationship and having steering knuckles at opposite ends thereof, a ground engaging wheel journalled on each knuckle, pairs of suspension springs respectively supported intermediate the ends thereof on the axles and having the outer ends respectively pivoted to the frame, an arm journalled on one side of the frame in advance of the front axle, a second arm pivoted at the said side of the frame in rear of the rear axle, drag links respectively connecting the swinging ends of the arms to the steering knuckles at the same side of the frame as the arms and having their respective axes lying in planes including the pivotal connections between the outer ends of the springs and frame, steering mechanism including an arm pivoted on the same side of the frame as the arms and having its axis spaced equal distances from the axes of said arms, and a pair of links having their inner ends respectively pivotally connected to the steering arm at different distances from the axis of swinging movement of said arm and having the outer ends respectively conected to the first and second arms.

ANCIL C. STOVER.

REFERENCES CITED

The following references are of record in the file of this patent:

UNITED STATES PATENTS

| Number | Name | Date |
|---|---|---|
| 1,660,189 | Fageol | Feb. 21, 1928 |
| 1,815,416 | Marcum | July 21, 1931 |
| 1,933,674 | Marcum | Nov. 7, 1933 |
| 1,947,787 | MacPherson | Feb. 20, 1934 |
| 2,323,669 | Murty et al. | July 6, 1943 |

FOREIGN PATENTS

| Number | Country | Date |
|---|---|---|
| 312,475 | Great Britain | May 30, 1929 |
| 336,666 | Great Britain | Oct. 20, 1930 |